United States Patent
Miyagi

(10) Patent No.: US 10,205,848 B2
(45) Date of Patent: Feb. 12, 2019

(54) PRINTING APPARATUS SERVING AS AN ACCESS POINT BASED ON AUTHENTICATION INFORMATION FOR A WIRELESS CONNECTION, PRINTING SYSTEM INCLUDING THE PRINTING APPARATUS, AND CONTROL METHOD OF THE PRINTING APPARATUS

(71) Applicant: CANON KABUSHIKI KAISHA, Tokyo (JP)

(72) Inventor: Arata Miyagi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/480,598

(22) Filed: Apr. 6, 2017

(65) Prior Publication Data
US 2017/0331977 A1 Nov. 16, 2017

(30) Foreign Application Priority Data
May 13, 2016 (JP) .................. 2016-097134

(51) Int. Cl.
*H04N 1/333* (2006.01)
*H04N 1/00* (2006.01)
*H04N 1/327* (2006.01)
*H04W 12/06* (2009.01)
*H04L 29/06* (2006.01)
(Continued)

(52) U.S. Cl.
CPC ............ *H04N 1/333* (2013.01); *G06F 3/128* (2013.01); *G06F 3/1222* (2013.01); *G06F 3/1239* (2013.01); *H04L 63/083* (2013.01); *H04N 1/00172* (2013.01); *H04N 1/00464* (2013.01); *H04N 1/32704* (2013.01); *H04N 1/32765* (2013.01); *H04W 12/06* (2013.01); *G06F 3/1238* (2013.01); *H04N 2201/0084* (2013.01);
(Continued)

(58) Field of Classification Search
USPC ............ 358/1.1–3.29, 409–411, 426.01–439
See application file for complete search history.

(56) References Cited

U.S. PATENT DOCUMENTS

2005/0050318 A1* 3/2005 Alone ................. H04L 63/0428
713/155
2008/0261640 A1* 10/2008 Yoshida ............. H04N 1/00278
455/517

(Continued)

FOREIGN PATENT DOCUMENTS

JP 2007-076187 A 3/2007

*Primary Examiner* — Marcellus Augustin
(74) *Attorney, Agent, or Firm* — Carter, Deluca, Farrell & Schmidt LLP

(57) ABSTRACT

A printing apparatus of the present invention makes wireless LAN connection in at least either one of a first connection mode for making wireless LAN connection to an image processing apparatus in which inherent authentication information is stored and a second connection mode for making wireless LAN connection to the image processing apparatus via a second access point provided by an apparatus other than the printing device and the image processing apparatus. The printing apparatus controls, in a case of connection in the first connection mode, a first function provided by the printing apparatus to be enabled and a second function which is enabled in the second connection mode to be disabled.

19 Claims, 13 Drawing Sheets

(51) Int. Cl.
*G06F 3/12* (2006.01)
*H04W 84/12* (2009.01)
(52) U.S. Cl.
CPC ..... *H04N 2201/0094* (2013.01); *H04W 84/12* (2013.01)

(56) References Cited

U.S. PATENT DOCUMENTS

| | | | | |
|---|---|---|---|---|
| 2011/0128389 | A1* | 6/2011 | Maeda | H04N 1/00204 348/207.1 |
| 2014/0287690 | A1* | 9/2014 | Kim | H04W 4/008 455/41.3 |
| 2016/0191723 | A1* | 6/2016 | Yue | H04N 1/00209 358/1.15 |

* cited by examiner

PRINTING APPARATUS SERVING AS AN ACCESS POINT BASED ON AUTHENTICATION INFORMATION FOR A WIRELESS CONNECTION, PRINTING SYSTEM INCLUDING THE PRINTING APPARATUS, AND CONTROL METHOD OF THE PRINTING APPARATUS

BACKGROUND OF THE INVENTION

Field of the Invention

The present invention relates to a printing apparatus which serves as a first access point based on inherent authentication information for wireless LAN connection.

Description of the Related Art

A printing apparatus having a direct printing function that connects a digital camera and the printing apparatus to each other so as to print an image transmitted from the digital camera is well known. Conventionally, most types of printing apparatuses having direct printing functions have been connected to digital cameras via cables such as a USB cable.

Recently, digital cameras and printing apparatuses adapted to a wireless LAN have become familiar in the market, and the demand for the printing apparatus to perform direct printing via the wireless LAN is increasing. Japanese Patent Laid-Open No. 2007-076187 discloses a printing system which connects a digital camera and a printing apparatus via a wireless LAN to perform direct printing via the wireless LAN.

SUMMARY OF THE INVENTION

A printing apparatus of the present invention serves as a first access point based on inherent authentication information for wireless LAN connection. The printing apparatus includes a connection unit configured to make wireless LAN connection in at least either one of a first connection mode for making wireless LAN connection to an image processing apparatus in which the inherent authentication information is stored and a second connection mode for making wireless LAN connection to the image processing apparatus via a second access point provided by an apparatus other than the printing apparatus and the image processing apparatus. The printing apparatus also includes a control unit configured to control, in a case of making connection in the first connection mode by the connection unit, a first function provided by the printing apparatus to be enabled and a second function which is enabled in the second connection mode to be disabled.

Further features of the present invention will become apparent from the following description of exemplary embodiments with reference to the attached drawings.

DESCRIPTION OF THE EMBODIMENTS

In an apparatus that connects to a printing apparatus via a wireless LAN, an SSID and a password for authentication for making connection to an access point are set to achieve communication of such information with the printing apparatus.

Further, as an SSID and a password for making connection to the printing apparatus, there is a case where an inherent SSID and an inherent authentication password are used. The inherent SSID and the inherent authentication password correspond to, for example, an SSID and authentication password common to the printing apparatuses and common to the digital cameras, which are written in respective nonvolatile memories of the printing apparatus and the digital camera at the time of their product shipment.

However, in a case where the same inherent SSID and the same inherent authentication password are used for the same product model or product lineup, for example, there may be a case where the same model of equipment owned by a third person can make wireless LAN connection to the printing apparatus. As a result, even though a user who owns the printing apparatus attempts to make connection to specific equipment, there may be a risk in which the equipment owned by the third person is connected to the printing apparatus using the above inherent SSID and the above inherent authentication password, irrelevant to the intention of the user. In such a case, there may be a risk in which a function not intended by the user will be used by the third person.

Hereinafter, an embodiment to carry out the present invention will be explained in detail with reference to the drawings. It should be noted that constituent elements described in the embodiment are mere examples, and thus, the scope of the present invention is not limited only to those constituent elements.

[First Embodiment]

Figure 1:
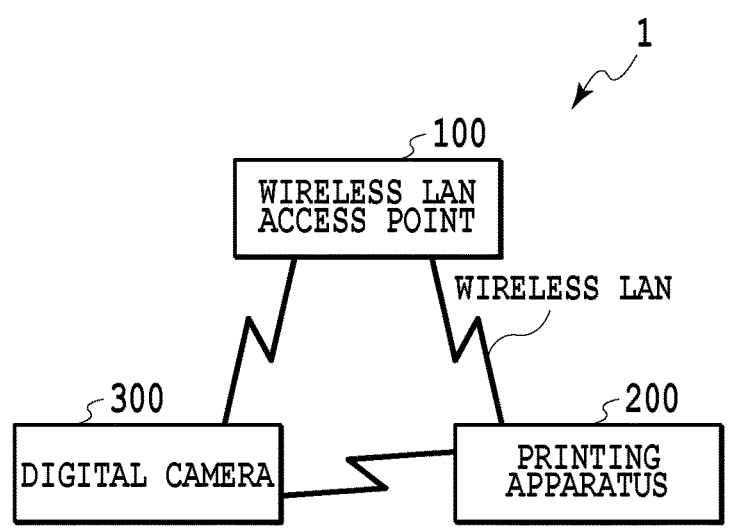
FIG. 1 is an example of a configuration of a printing system according to a first embodiment.

FIG. 1 is an example of a configuration of A printing system 1 according to the present embodiment. Each of a printing apparatus 200 and a digital camera 300 can make a wireless LAN connection to an access point 100. In addition, each of the printing apparatus 200 and the digital camera 300 can serve as an access point, and thus the printing apparatus 200 and the digital camera 300 can be connected to the wireless LAN without using the access point 100.

Figure 2:
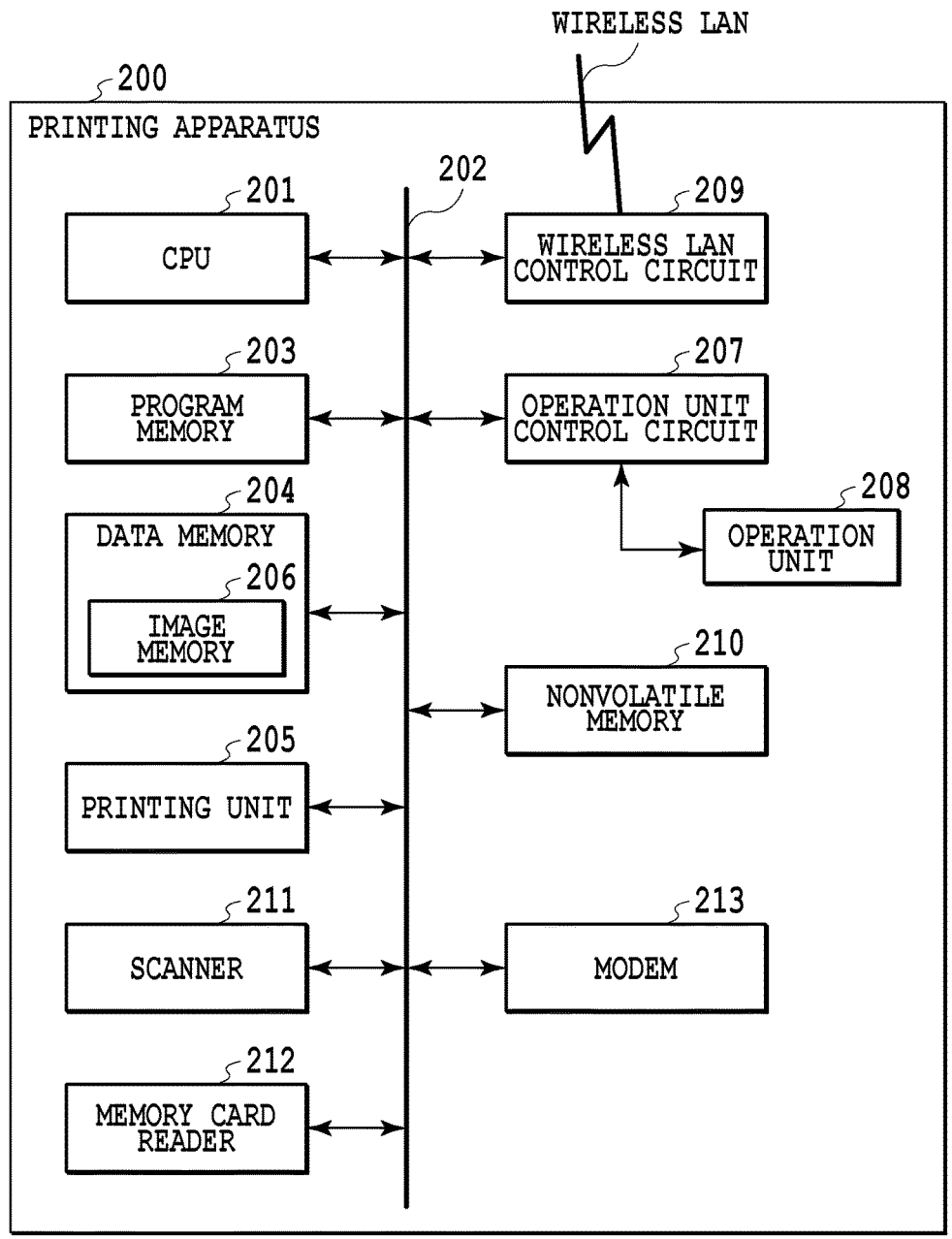
FIG. 2 is a block diagram showing a configuration of a printing apparatus according to the first embodiment.

FIG. 2 is a block diagram showing a configuration of the printing apparatus 200 according to the present embodiment. The printing apparatus 200 of the present embodiment is, for example, a multifunction peripheral (MFP) including a printing function in which an image is formed on a printing medium such as a sheet and a scanning function in which a document mounted on an automatic document feeder or the like is read. The MFP of the present embodiment may include functions other than the above-described printing function and scanning function. A CPU 201 of a microprocessor type operates in accordance with a control program stored in a program memory 203 of a ROM type connected via an internal bus 202 and various contents of data stored in a data memory 204 of a RAM type. The CPU 201 prints image data stored in an image memory 206 on the printing medium by controlling a printing unit 205. Further, the CPU 201 controls an operation unit control circuit 207 to cause an operation unit 208 to display the state of the printing apparatus 200 and to display a function selection menu, and to further display operation acceptance for accepting operation from a user. The operation unit 208 of the present embodiment is composed of a touch panel. The user touches an object displayed on the operation unit 208 so that operation indicated in the object can be accepted. Further, the CPU 201 controls a wireless LAN control circuit 209 to communicate with another apparatus connected to the access point 100 via a wireless LAN. Due to such a configuration, once a print job is received from the other apparatus, the CPU 201 can cause the printing unit 205 to perform printing in accordance with the received print job. In addition, the CPU 201 can cause the printing apparatus 200 itself to serve as an access point by controlling the wireless LAN control circuit 209. A nonvolatile memory 210 includes a battery backup RAM, an EEPROM, and a flash memory, and retains data even in a case where power supply to the printing apparatus is interrupted. Data that needs to be retained even in the case where power supply is interrupted, such as setting information of the printing apparatus 200, is written in the nonvolatile memory 210. A scanner 211 can read a document by either or both of a flatbed system and an ADF system. The CPU 201 stores image data acquired from the scanner 211 in the image memory 206. Further, the CPU 201 controls the wireless LAN control circuit 209 to receive a scan job from another apparatus connected to the access point 100 via the wireless LAN and to transmit image data acquired from the scanner 211 to the other apparatus. A memory card reader 212 reads/writes data recorded in each type of memory card from/in the memory card inserted into the memory card reader 212. A modem 213 is connected to a telephone line, and transmission and reception of a facsimile is made based on control by the CPU 201. The CPU 201 transmits image data retained in the image memory 206 by the facsimile via the modem 213. In addition, the CPU 201 stores image data received by the facsimile via the modem 213 in the image memory 206 and cause the printing unit 205 to print it out. The CPU 201 transmits image data retained in the image memory 206 to another apparatus connected to the wireless LAN.

Moreover, the printing apparatus 200 can serve as an access point adapted to an inherent SSID and an inherent password. The SSID and password as well as a program for serving as the access point are stored in the program memory 203 or the nonvolatile memory 210.

Figure 3:
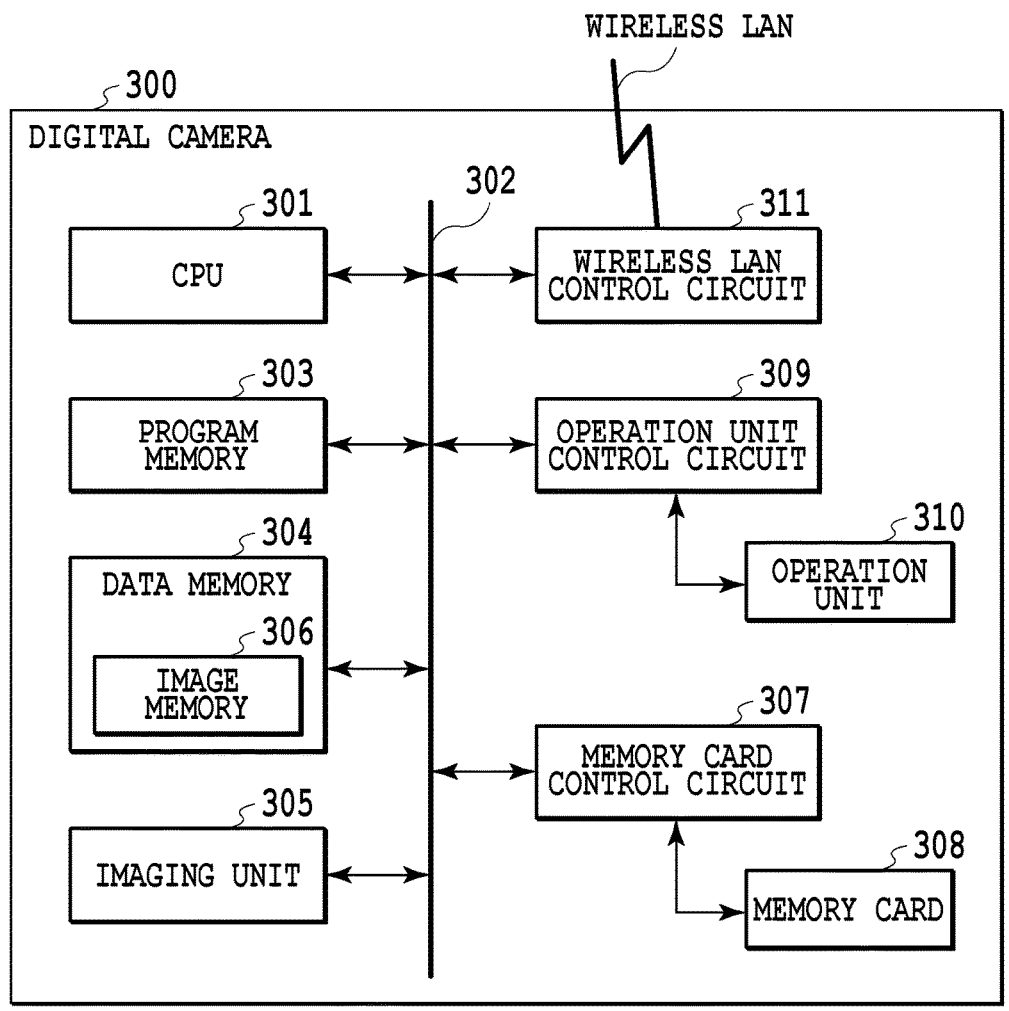
FIG. 3 is a block diagram showing a configuration of a digital camera according to the first embodiment.

FIG. 3 is a block diagram showing a configuration of the digital camera 300 according to the present embodiment. A CPU 301 of a microprocessor type operates in accordance with a control program stored in a program memory 303 of a ROM type connected via an internal bus 302 and various contents of data stored in a data memory 304 of a RAM type. The CPU 301 controls an imaging unit 305 to perform photographing and stores thus photographed image data in an image memory 306. The image data stored in the image memory 306 is converted into a predetermined format such as jpeg, and then is stored in a memory card 308 via a memory card control circuit 307. Further, the CPU 301 controls an operation unit control circuit 309 to display a photographed image on an operation unit 310. The CPU 301 also displays various function selection menus to accept user's operation to the function selection menus. In addition, the CPU 301 controls a wireless LAN control circuit 311 to communicate with another apparatus connected to the access point 100 via a wireless LAN. Due to such a configuration, the CPU 301 can exchange the photographed image data with the other apparatus connected to the access point 100 via the wireless LAN. Moreover, the digital camera 300 (i.e., CPU 301) of the present embodiment also transmits a print job which is a command of outputting the photographed image data to the printing apparatus 200 connected to the access point 100 via the wireless LAN. Also, the CPU 301 controls the wireless LAN control circuit 311 to cause the digital camera 300 itself to serve as an access point. As such, the digital camera 300 which acquires the image by controlling the imaging unit 305 functions as an image processing apparatus in the present embodiment.

Moreover, the digital camera 300 stores an inherent SSID and an inherent password at the time in which the printing apparatus 200 serves as an access point in the program memory 303. Furthermore, in the event of transiting to a specific AP mode as will be described later, the digital camera 300 attempts to make connection to the access point in accordance with the inherent SSID and the inherent password stored in the program memory 203 even without input of an SSID and password by the user.

To be more specific, the above inherent SSID and the above inherent password are stored beforehand in each of the digital camera 300 and the printing apparatus 200 without making communication to each other or without user's input to the operation unit 208 or the operation unit 310. Accordingly, in the specific AP mode using the inherent SSID and the inherent password, the digital camera 300 can be easily connected to the printing apparatus 200. Meanwhile, there is a case where the inherent SSID and the inherent password that are common to a certain model or the like are stored. As a result, in a case where a third person, who is irrelevant to a user of the printing apparatus 200, owns the same model of a digital camera, the digital camera may unintentionally be connected to the printing apparatus 200 by the specific AP mode. Accordingly, in the present embodiment, network services (i.e., functions of the printing apparatus) that are to be enabled in the printing apparatus are limited in the specific AP mode. The details will be described later.

Figure 4:
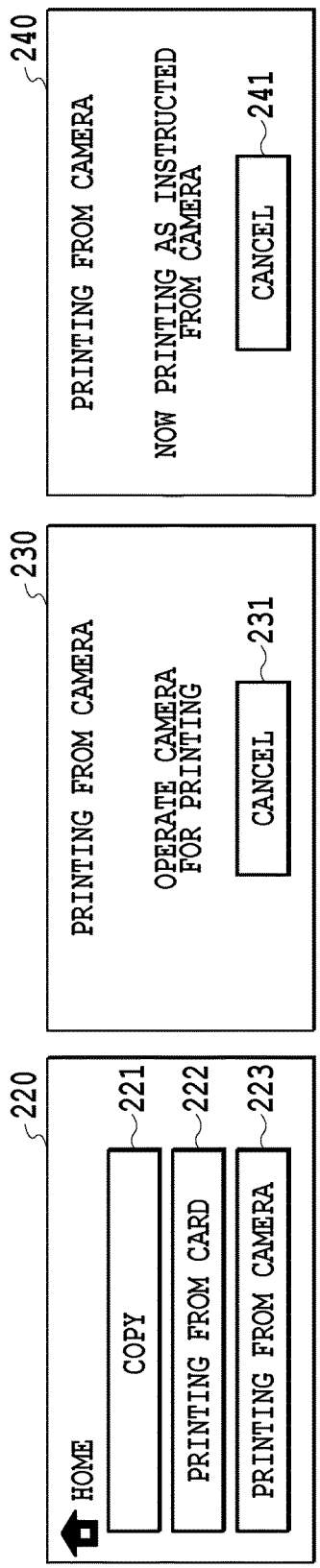
FIGS. 4A to 4C are views showing examples displayed on an operation screen of the printing apparatus according to the first embodiment.

FIGS. 4A to 4C are views showing examples of an operation screen displayed on the operation unit 208 of the printing apparatus 200 according to the present embodiment.

FIG. 4A is a home screen 220 of the printing apparatus 200. The home screen 220 includes, in response to accepting user's operation, an operation button 221 which is to be transited to a copy mode and an operation button 222 which is to be transited to a print mode out of image data stored in a memory card. Further, below the operation button 222, an operation button 223 which is to be transited to a direct print mode to make direct printing from the digital camera 300 is arranged.

FIG. 4B shows a printing waiting screen 230 which is displayed after the operation button 223 is pressed to be transited to the direct print mode until the completion of the reception of a print job. The printing waiting screen 230 displays a message that urges a user to make print operation on the digital camera 300 and further displays a cancel button 231. Once the user's operation of the cancel button 231 is accepted, the printing apparatus 200 ends the direct print mode and the home screen 220 is displayed again.

FIG. 4C shows a now-printing screen 240 which is displayed after the completion of the reception of the print job from the digital camera 300 and during the printing of image data. The now-printing screen 240 displays a message indicating that the print job received from the digital camera 300 is in execution and further displays a cancel button 241. Once the user's operation of the cancel button 241 is accepted, the printing apparatus 200 stops the print job in execution, and after the direct print mode ends, the home screen 220 is displayed again.

Figure 5:
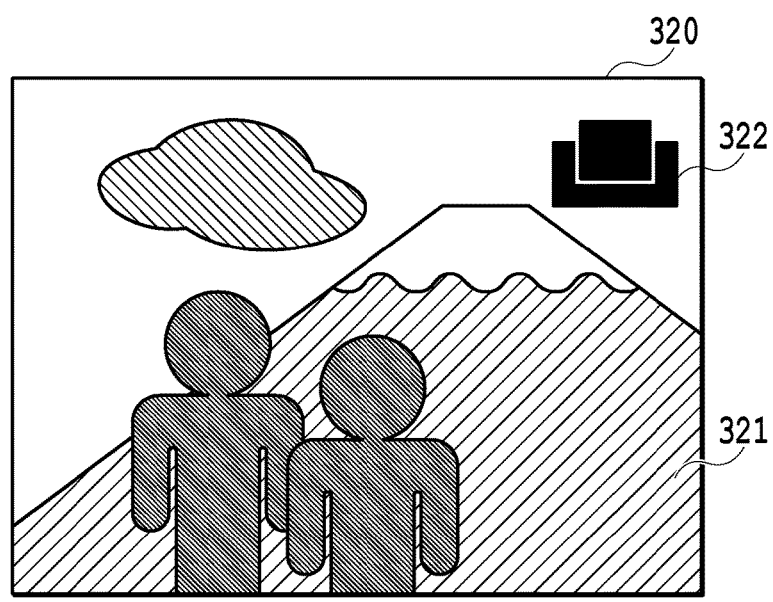
FIG. 5 is a view showing an example of an image reproducing screen on the digital camera according to the first embodiment.

FIG. 5 is a view showing an example of an image reproducing screen 320 displayed on the operation unit 310 of the digital camera 300 according to the present embodiment. The digital camera 300 (i.e., CPU 301) displays a photographed image 321 on the entire operation unit 310, and at the same time, displays an operation button 322 superimposingly on the image 321. Once the user's operation of the operation button 322 is accepted, the digital camera 300 (i.e., CPU 301) transmits the printing apparatus 200 a print job instructing printing the image 321 displayed on the operation unit 310.

Figure 6:
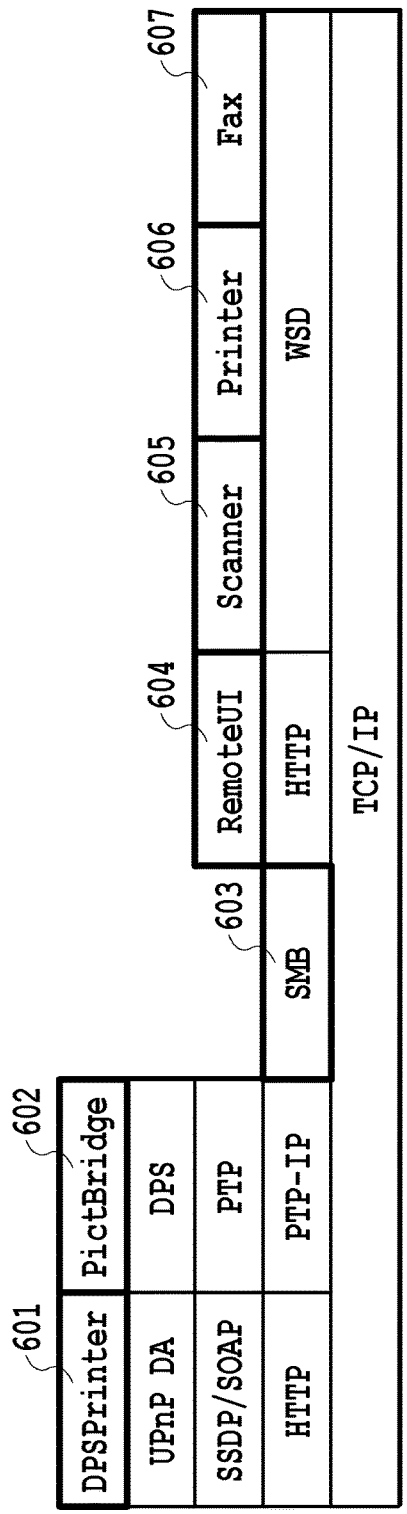
FIG. 6 is a schematic diagram indicating available network services provided by the printing apparatus according to the first embodiment.

FIG. 6 is a schematic diagram indicating available network services provided by the printing apparatus 200 according to the present embodiment. The printing apparatus 200 provides various network services shown in the schematic diagram of FIG. 6 in response to a request of providing a service from the printing apparatus 200 (i.e., CPU 201) itself or another apparatus connected to a wireless LAN. In FIG. 6, reference numerals 601 through 607 denote services (i.e., functions of the printing apparatus 200) and also denote their protocols used for communication for utilizing those functions. Specifically, DPSPrinter 601 is a service of providing connection for image transfer by a picture transfer protocol (PTP) session. This service is operated by using each of protocols, namely, UPnPDA, SSDP/SOAP, and HTTP. PictBridge 602 is a service that uses a PTP-IP standard which connects TCP/IP layer and PTP in a TCP session to provide connection between a camera and a printer for achieving a direct printing function between the digital camera 300 and the printing apparatus 200. SMB 603 is a service for sharing a file system on Windows (registered trademark) network. The SMB 603 is utilized in a case where image data in a memory card connected to the memory card reader 212 is read out from another apparatus (such as a personal computer) connected to a wireless LAN. RemoteUI 604 is a service of providing an access from a web browser using an HTTP protocol. By use of the RemoteUI 604, a user can change the setting of the printing apparatus 200 from the web browser operated by another apparatus connected to a wireless LAN to browse the state of the printer. Scanner 605 provides a service of reading a document by driving the scanner 211 in response to a request of a service from another apparatus connected to a wireless LAN. Printer 606 provides a service of causing the printing unit 205 to make output in response to a request of a service from another apparatus connected to a wireless LAN. FAX 607 provides a service of causing a non-illustrated public line to make facsimile transmission via the modem 213 in response to a request of a service from another apparatus connected to a wireless LAN. These services are operated by using network protocols such as TCP/IP, HTTP, and WSD. The above-described network protocols are mere examples, and the printing apparatus 200 may be configured to be operated by using a network protocol other than the above. Further, each of the network services may be configured to be switched between enabled/disabled by the setting accepted by user's input through the operation unit 208.

Figure 7:
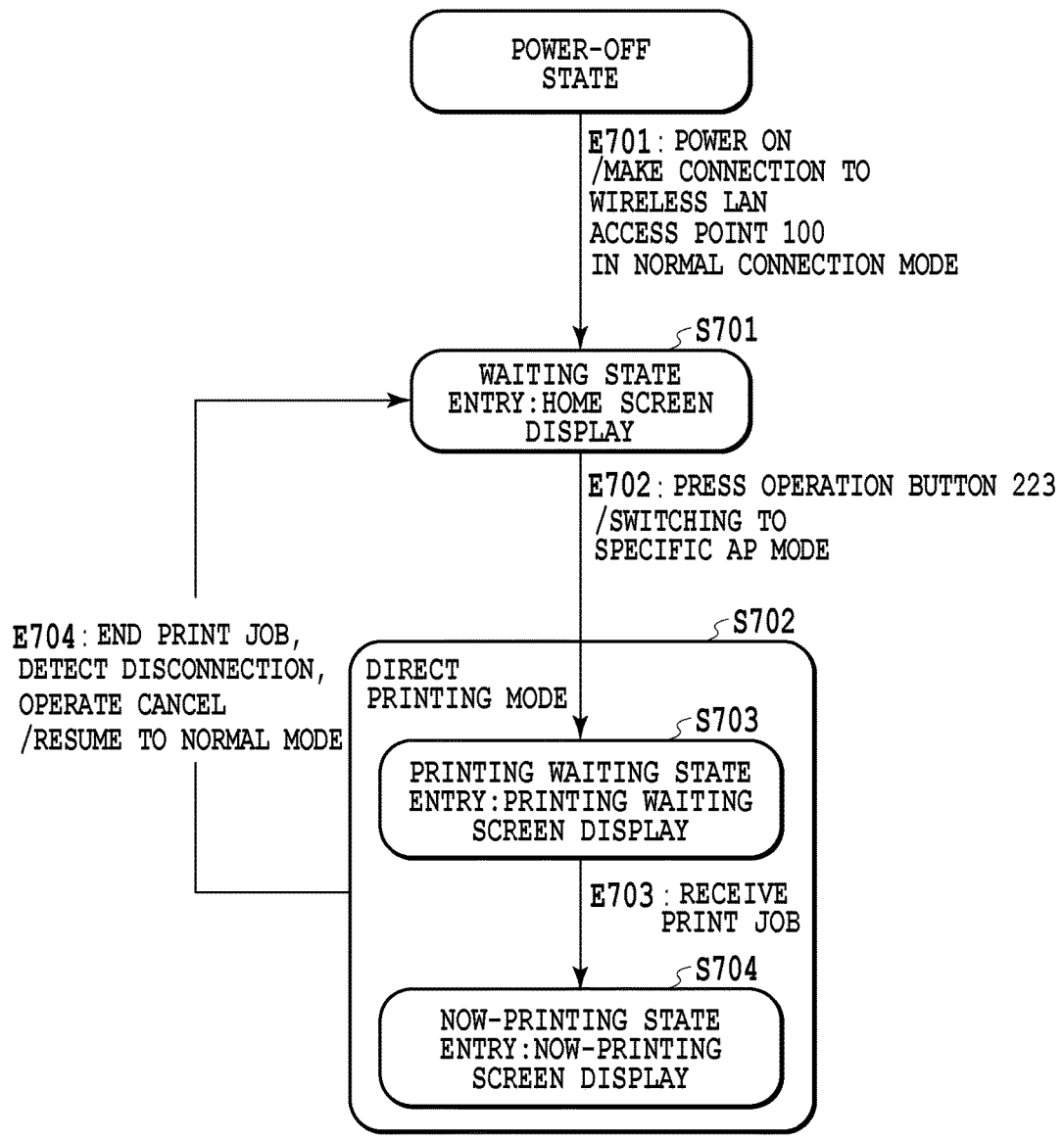
FIG. 7 is a state transition diagram of the printing apparatus according to the first embodiment.

FIG. 7 is a state transition diagram of the printing apparatus 200 according to the present embodiment. The state transition diagram shown in FIG. 7 is described in accordance with a UML description rule. Each block indicates the state of the printing apparatus 200 while each arrow connecting the blocks indicates the state transition of the printing apparatus 200. An explanation associated with each arrow has a former part and a latter part, that is, the former part indicates an event which is to be a trigger of the state transition and the latter part following a slash (/) indicates an action to be executed at the time of the state transition.

In a case where the printing apparatus 200 is in a power-off state (i.e., an initial state), once a power-on event (E701) occurs, the printing apparatus 200 transits to a waiting state S701. At this time, the printing apparatus 200 is connected to a wireless LAN in a normal connection mode. Here, the normal connection mode according to the present embodiment is one of operation modes for IEEE 802.11 wireless LAN, and is a connection mode that is connected to a wireless LAN by using an SSID and authentication password which are authentication information arbitrarily set. Specifically, the printing apparatus 200 controls the wireless LAN control circuit 209 to establish connection to the access point 100 (in FIG. 1). In the present embodiment, the access point 100 itself does not issue a job but has a function to relay an issued job or the like. The printing apparatus 200 and the digital camera 300 are connected via the access point 100, and thus, direct communication therebetween is not made. Among the normal connection modes, such a connection mode for connecting the printing apparatus 200 and the digital camera 300 via the access point 100 is also denoted as an infrastructure mode. In another embodiment, the digital camera 300 which issues a job by itself and the printing apparatus 200 which processes the issued job can serve as access points.

In S701, the CPU 201 of the printing apparatus 200 activates available network services provided by the printing apparatus 200. In a case where each network service is set to be enabled/disabled in accordance with user's operation accepted through the operation unit 208, the CPU 201 enables a network service in accordance with the setting. In the waiting state in S701, the home screen 220 is displayed on the operation unit 208. In S701, in a case where the operation button 223 is pressed (E702), a connection mode to a wireless LAN is switched from the infrastructure mode to a specific access point mode (hereinafter also denoted as a "specific AP mode"). Further, along with the switching of the modes for the wireless LAN connection, the printing apparatus 200 transits its mode to the direct print mode in S702.

Here, the specific AP mode is a connection mode for making the wireless LAN connection by using the inherent SSID and the inherent authentication password which are authentication information common to the printing apparatus 200 and the digital camera 300 to allow the printing apparatus 200 to perform direct printing. The SSID and authentication password to be used in the specific AP mode differ from the above-described SSID and authentication password arbitrarily set. In the present embodiment, the SSID and authentication password used in the specific AP mode are, for example, inherent information written beforehand in storage areas such as the nonvolatile memory 210 and the program memory 303 at the time of product shipment of the printing apparatus 200 and the digital camera 300. The SSID and authentication password used in the specific AP mode as in the present embodiment may be set to be common to models whose connection therebetween is expected in the direct print mode. It should be noted that, in the present embodiment, the example of using the SSID and authentication password in both the normal connection mode and the specific AP mode has been described, but another embodiment may be configured to make wireless LAN connection only by using the SSID.

The direct print mode in S702 includes a printing waiting state in S703 and a now-printing state in S704. In the direct print mode in S702, the printing apparatus 200 transits its state to the printing waiting state in S703.

In the printing waiting state in S703, the printing waiting screen 230 is displayed on the operation unit 208. In the printing waiting state in S703, once the printing apparatus 200 receives a print job from the digital camera 300, the print job reception (E703) occurs and the printing apparatus 200 transits its state to the now-printing state in S704.

In the now-printing state in S704, the now-printing screen 240 is displayed on the operation unit 208. In S702, if either one of the end of the print job, the disconnection of the digital camera, and cancel operation to the operation unit is detected (E704), the printing apparatus 200 resumes the wireless LAN connection mode to the normal connection mode (i.e., the infrastructure mode). Furthermore, along with the switching of the wireless LAN connection mode, the printing apparatus 200 transits its state to the waiting state in S701. The above is a series of the state transitions of the printing apparatus 200 in a case where direct printing is instructed from the digital camera 300. It should be noted that the home screen 220 is configured to accept the user's operation of operation buttons other than the operation buttons 221 and 222 so that the printing apparatus 200 performs processing other than the direct printing.

Figure 8:
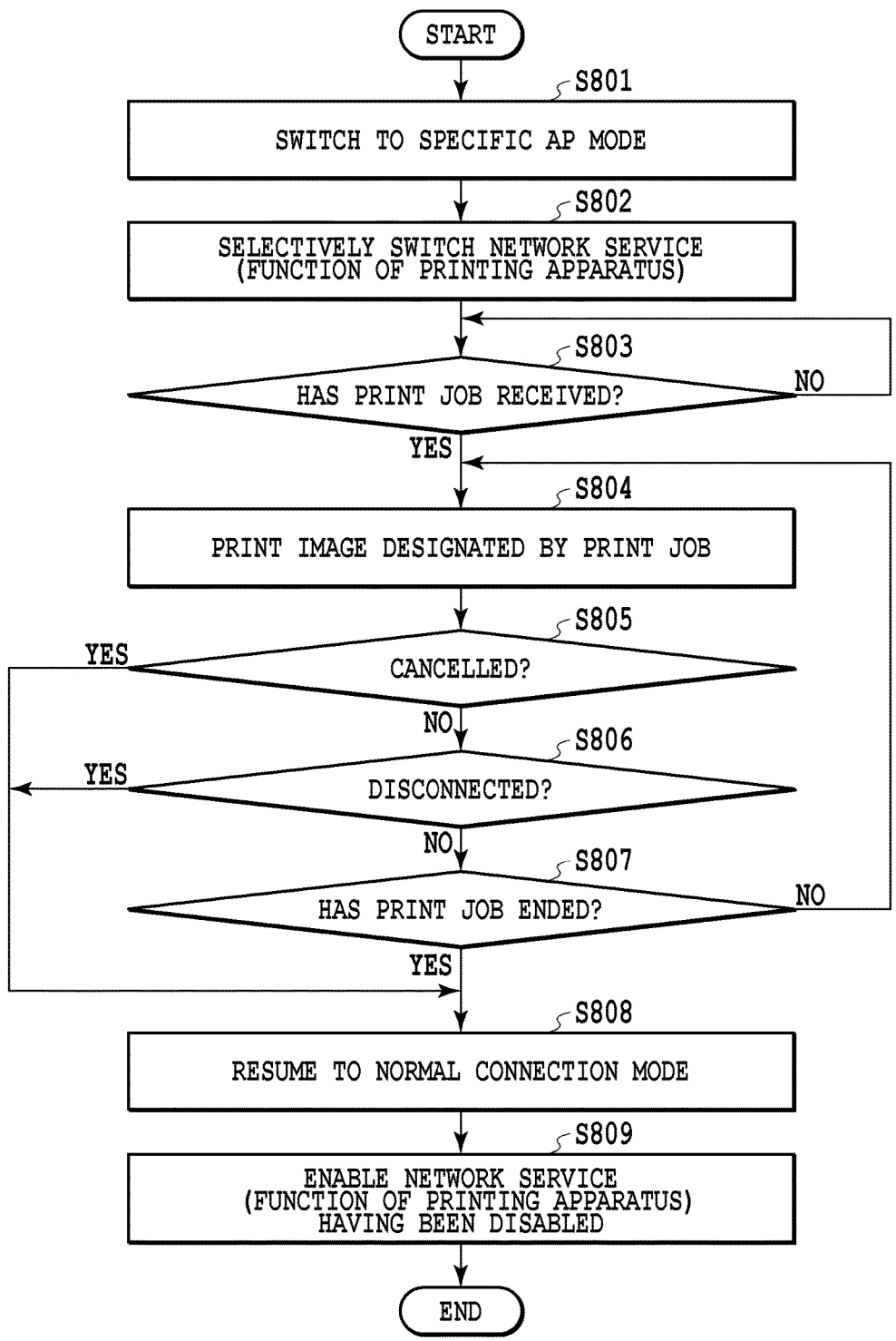
FIG. 8 is a flow chart showing steps of the printing apparatus according to the first embodiment.

FIG. 8 is a flow chart showing steps of switching the wireless LAN connection mode by the printing apparatus 200 according to the present embodiment. The flow chart of FIG. 8 shows a series of switching steps executed by the CPU 201 which is started upon pressing the operation button 223 as a trigger while the home screen 220 (in FIGS. 4A to 4C) is displayed on the operation unit 208. It should be noted that processing in the flow chart shown in FIG. 8 is executed by the CPU 201 by loading a program code stored in the program memory 203. The same applies to FIG. 13 which will be described later.

In Step S801, the CPU 201 of the printing apparatus 200 controls the wireless LAN control circuit 209 to switch the wireless LAN connection mode to a mode in which the printing apparatus 200 serves as an access point. At this time, in order to make connection to the digital camera 300 which is an apparatus who has issued the print job, the CPU 201 causes the printing apparatus 200 to operate in the specific AP mode using the inherent SSID and the inherent authentication password.

In Step S802, the CPU 201 selectively switches network services (the functions of the printing apparatus) to be provided to the digital camera 300. To be more specific, among available network services (in FIG. 6) provided by the printing apparatus 200, the CPU 201 disables some of the network services and enables only network services required for the direct printing. The network services unrequired for the direct printing is disabled, and these network services are stopped. Specifically, according to the present embodiment, the network services required for the direct printing are DPSPrinter 601 and PictBridge 602. Other services, namely, SMB 603, RemoteUI 604, Scanner 605, and Printer 606 are network services unrequired for the direct printing, and these services are controlled to be stopped in a case where the printing apparatus 200 transits its mode to the specific AP mode. It should be noted that each of the network services (i.e., functions) of 603 through 606 which are disabled in S802 as described above are enabled in the above-described infrastructure mode. In other words, in S802, at least some functions (i.e., network services) which have been enabled in the infrastructure mode are disabled.

In Step S803, the CPU 201 determines whether a print job transmitted from the digital camera 300 has been received or not, and if the print job is received (YES in Step S803), the process transits to Step S804. If the print job is not received (No in Step S803), the process returns to Step S803 again.

In Step S804, image files designated by the print job are sequentially received from the digital camera 300, and the CPU 201 causes the printing unit 205 to print image data. In the printing apparatus 200, steps to print the received image files should conform to the standards such as DPS over IP, which is a well-known technique. Accordingly, their explanations in detail will be omitted.

The CPU 201 repeatedly executes processing of Step S804 through Step S807. To be more specific, in Step S805, the CPU 201 determines whether the cancel button 241 displayed on the now-printing screen 240 is pressed or not, and if the button is pressed, the processing of the print job is stopped and the process transits to Step S808.

In Step S806, the CPU 201 determines whether the connection to the digital camera 300 is disconnected or not, and if the connection is disconnected, the processing of the print job is stopped and the process transits to Step S808.

In Step S807, the CPU 201 determines whether the entire printing processing of the image designated by the print job has been completed or not, and if the processing is completed (YES in S807), the process transits to Step S808. On the other hand, if the processing is not completed, the process returns to Step S804.

In Step S808, the CPU 201 controls the wireless LAN control circuit 209 to switch the wireless LAN connection mode to the normal connection mode (i.e., infrastructure mode).

In Step S809, the CPU 201 reactivates the network services that have been disabled in Step S802 to enable those network services again. Upon ending Step S809, the processing of this flow chart ends.

Figure 9:
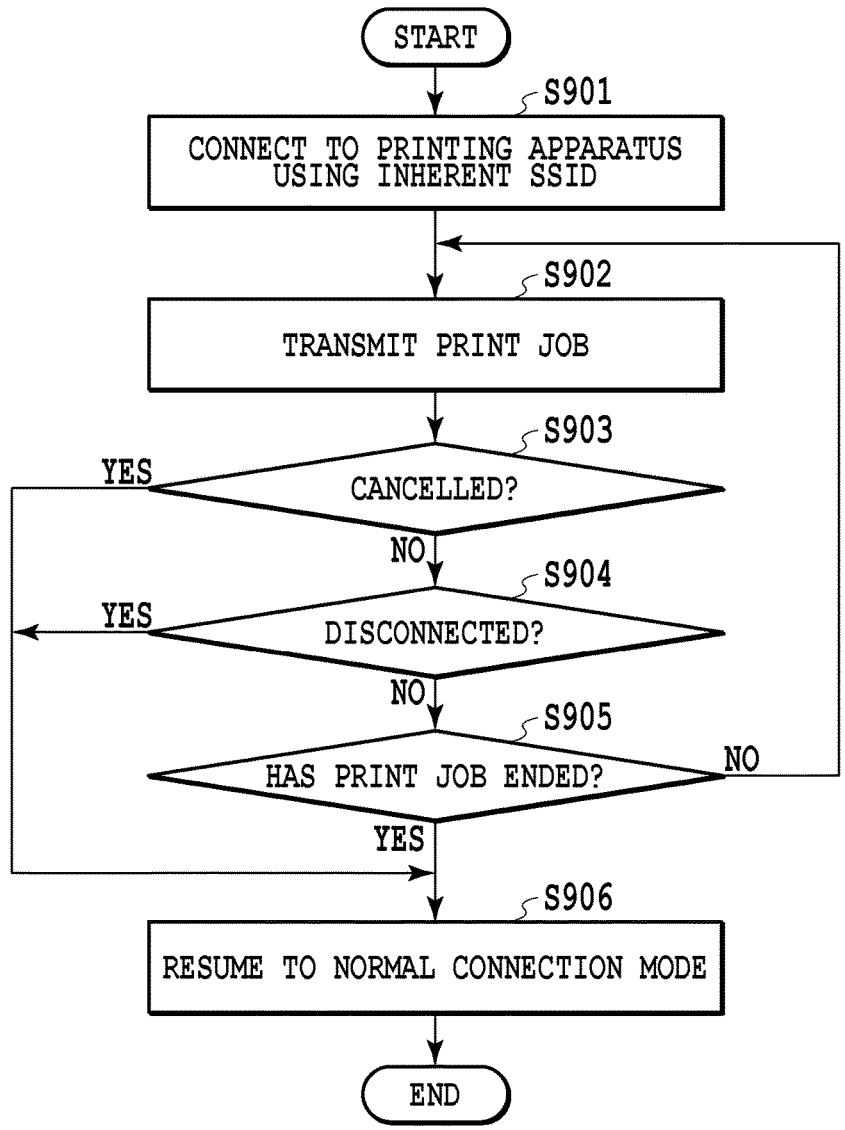
FIG. 9 is a flow chart showing steps of the digital camera according to the first embodiment.

FIG. 9 is a flow chart showing steps in which the digital camera 300 transmits a print job of direct printing according to the present embodiment. The flow chart of FIG. 9 shows a series of steps executed by the CPU 301 which is started upon pressing the operation button 322 as a trigger while the image reproducing screen 320 (in FIG. 5) is displayed on the operation unit 310. It should be noted that processing in the flow chart shown in FIG. 9 is executed by the CPU 301 by loading a program code stored in the program memory 303.

In Step S901, the CPU 301 of the digital camera 300 controls the wireless LAN control circuit 311 to cause the printing apparatus 200 operating in the specific AP mode to make connection to the digital camera 300 as a wireless LAN client. At this time, in order to make connection to the printing apparatus 200 which is an access point, the CPU 301 uses the inherent SSID and the inherent authentication password to connect the digital camera 300 to the printing apparatus 200. Specifically, the CPU 301 searches a wireless LAN access point using the inherent SSID as a key, and transmits a connection request including the authentication password that corresponds to the inherent SSID to the printing apparatus 200. Once the authentication is made, the wireless LAN connection is established between the digital camera 300 and the printing apparatus 200.

In Step S902, the CPU 301 transmits to the printing apparatus 200 a print job that instructs printing of an image file stored in the image memory 306. According to the present embodiment, the print job that instructs printing of an image displayed on the image reproducing screen 320, for example, is transmitted to the printing apparatus 200.

The CPU 301 repeatedly executes the processing of Step S902 through Step S905. To be more specific, in Step S903, the CPU 301 determines whether the user's cancel operation of the operation unit 310 of the digital camera 300 has been accepted or not. If the user's cancel operation is accepted (YES in Step S903), the transmission of the print job is stopped and the process transits to Step S906.

In Step S904, the CPU 301 determines whether the connection to the printing apparatus 200 has been interrupted or not, and if the connection has been interrupted, the transmission of the print job is stopped and the process transits to Step S906.

In Step S905, the CPU 301 determines whether the entire transmission of the print job has been completed or not, and if the transmission has been completed (YES in Step S905), the process transits to Step S906. Meanwhile, if the transmission is not completed, the process returns to Step S902.

In Step S906, the CPU 301 controls the wireless LAN control circuit 311 to switch the wireless LAN connection mode to the normal connection mode (i.e., infrastructure mode). To be more specific, the digital camera 300 is brought back to the state before making connection to the printing apparatus 200 as the wireless LAN client (in Step S901), and the processing according to this flow chart ends.

Incidentally, the print job received in S803 (transmitted in S902) may be a print job for printing one image file or may be a print job for printing a plurality of image files. For example, in the operation unit 310 of the digital camera 300, a user selects one or the plurality of image files. Further, in a case where the plurality of image files are selected, the plurality of images are displayed on the screen shown in FIG. 5 as a printing object. It should be noted that the images displayed on the operation unit 310 may also be downsized images which are different from an image to be printed.

In a case where the plurality of images are to be printed based on a print job, the CPU 201 determines whether the printing of the plurality of images has been completed or not in S807.

Figure 10:
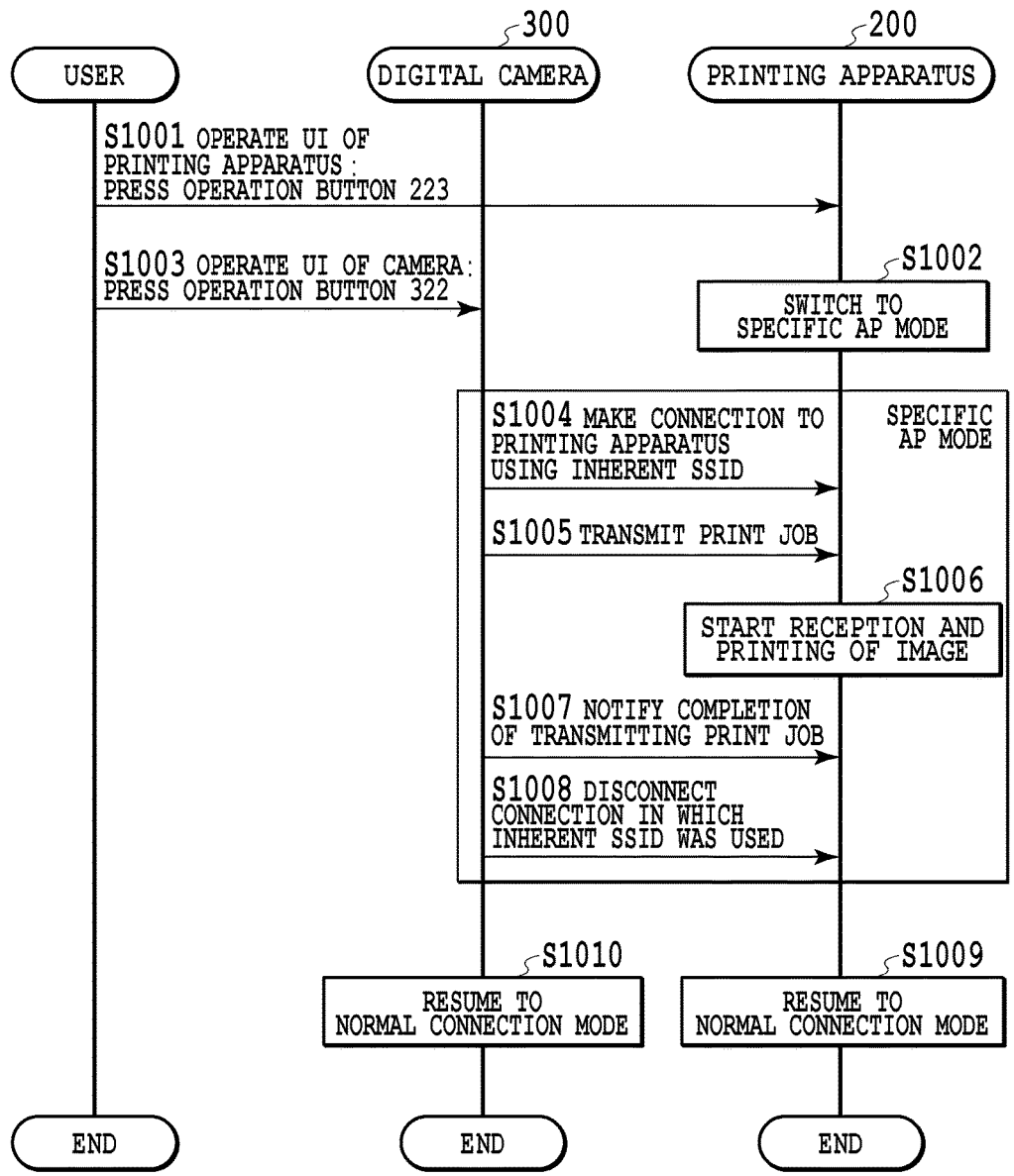
FIG. 10 is a sequence diagram relating to an example of direct printing according to the first embodiment.

FIG. 10 is a sequence diagram relating to an example of direct printing between the printing apparatus 200 and the digital camera 300 according to the present embodiment.

In Step S1001, once the operation button 223 of the home screen 220 is pressed, the printing apparatus 200 (i.e., CPU 201) switches, in Step S1002, the wireless LAN connection mode to the specific AP mode.

In Step S1003, once the operation button 322 of the image reproducing screen 320 is pressed, in Step S1004, the digital camera 300 (i.e., CPU 301) issues a request to make connection to the printing apparatus 200 using the inherent SSID and the inherent authentication password.

In Steps S1002 and S1004, the printing apparatus 200 operating in the specific AP mode accepts the connection request from the digital camera 300, and if the connection request includes authentication information, authenticates the wireless LAN connection to the digital camera 300. Once the authentication is made, the wireless LAN connection setting the digital camera 300 as a wireless LAN client is established.

In Step S1005, a print job is transmitted from the digital camera 300 to the printing apparatus 200.

In Step S1006, the printing apparatus 200 starts, in response to the reception of the print job, receiving and printing an image file designated by the print job.

Once the transmission of the print job and the image file to be printed is completed, in Step S1007, the digital camera 300 notifies the printing apparatus 200 of the completion of transmitting the print job.

In Step S1008, the digital camera 300 cuts connection to the printing apparatus 200 which has been established using the inherent SSID and the inherent authentication password. To be more specific, the connection between the printing apparatus 200 operating in the specific AP mode and the digital camera 300 operating as the wireless LAN client is disconnected.

In Step S1009, the printing apparatus 200 resumes the wireless LAN connection mode to the normal connection mode.

In Step S1010, the digital camera 300 resumes the wireless LAN connection mode to the normal connection mode.

As described above, in FIG. 10, once the transmission of the print job and the image file to be printed is completed, the digital camera 300 and the printing apparatus 200 resume their modes to the normal connection modes (in S1010 and S1009). In this case, from S1007 to S1009, such resumptions may be executed regardless of whether or not the printing which has been started is completed in S1006. In other words, even during the printing, the digital camera 300 and the printing apparatus 200 resume their modes to the normal connection mode, and thus time required to make communication in the specific AP mode can be shortened. On the other hand, the digital camera 300 and the printing apparatus 200 may be configured to resume their modes to the normal connection modes after accomplishing the printing in the printing apparatus 200. For example, the printing apparatus 200 notifies the digital camera 300 of the completion of the printing and then the digital camera 300 performs processing of S1008, whereby both the printing apparatus 200 and the digital camera 300 resume their modes to the normal connection modes. Alternatively, for example, the printing apparatus 200 may be configured to notify, in response to the completion of the printing, the digital camera 300 of the same notice as the one made by the digital camera 300 in S1008 so that both the printing apparatus 200 and the digital camera 300 resume their modes to the normal connection modes. In a case where the digital camera 300 and the printing apparatus 200 resume their modes to the normal connection modes after completing the printing in such a manner, the printing apparatus 200 notifies the digital camera 300 of a printing status (such as the progress of printing and the presence/absence of an error) in the specific AP mode.

Figure 11:
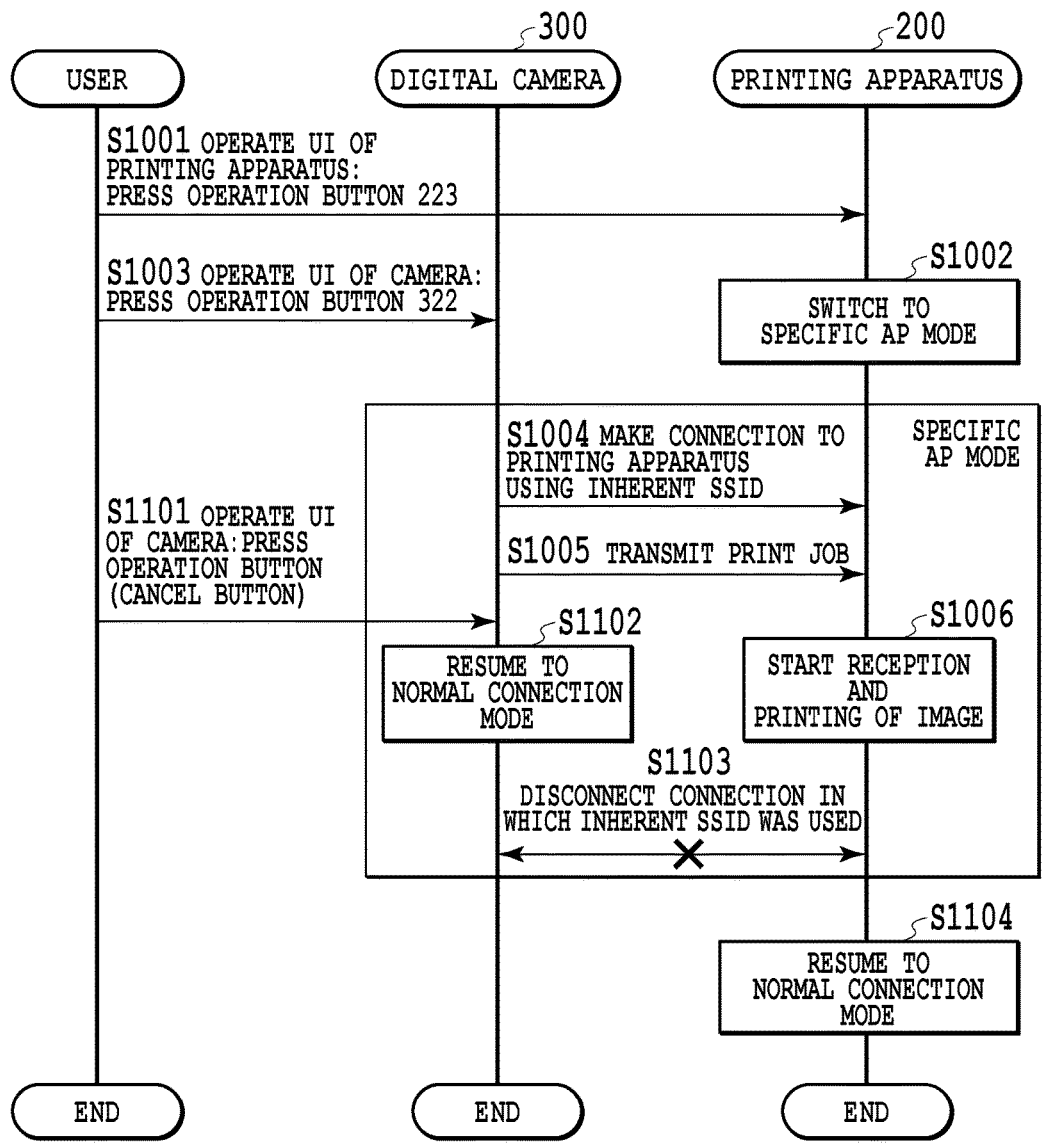
FIG. 11 is a sequence diagram relating to another example of the direct printing according to the first embodiment.

FIG. 11 is a sequence diagram relating to another example of direct printing between the printing apparatus 200 and the digital camera 300 according to the present embodiment. The sequence diagram of FIG. 11 differs from that of FIG. 10 in that the former shows a sequence in a case where user's cancel operation is made on the digital camera 300 during printing by the printing apparatus 200.

In the sequence diagram shown in FIG. 11, the processing of Step S1001 through Step S1006 is identical to the processing denoted by the same reference numerals in FIG. 10, and thus their explanations will be omitted.

In Step S1101, once a cancel button (not shown) displayed on the operation unit 310 is pressed, the digital camera 300 stops transmitting the print job.

In Step S1102, the digital camera 300 (i.e., CPU 301) resumes the wireless LAN connection mode to the normal connection mode.

As a result of processing of Step S1102, the wireless LAN connection between the printing apparatus 200 operating in the specific AP mode and the digital camera 300 is to be disconnected in Step S1103.

In Step S1104, the printing apparatus 200 detects that the wireless LAN connection to the digital camera 300 is disconnected, and then resumes the wireless LAN connection mode to the normal connection mode.

In FIG. 11, since the connection in the specific AP mode is disconnected in S1103, printing is not made if the image file corresponding to the print job is not transmitted until the disconnection. Further, even if a plurality of image files are to be printed, image files transmitted before the disconnection of the communication will be printed but the rest of the image files thereafter will not be printed.

Incidentally, the digital camera 300 may give an instruction to cancel the printing to the printing apparatus 200 before resuming its mode to the normal connection mode in S1102. In this case, the printing apparatus 200 disconnects the printing even if the printing has been already started.

Figure 12:
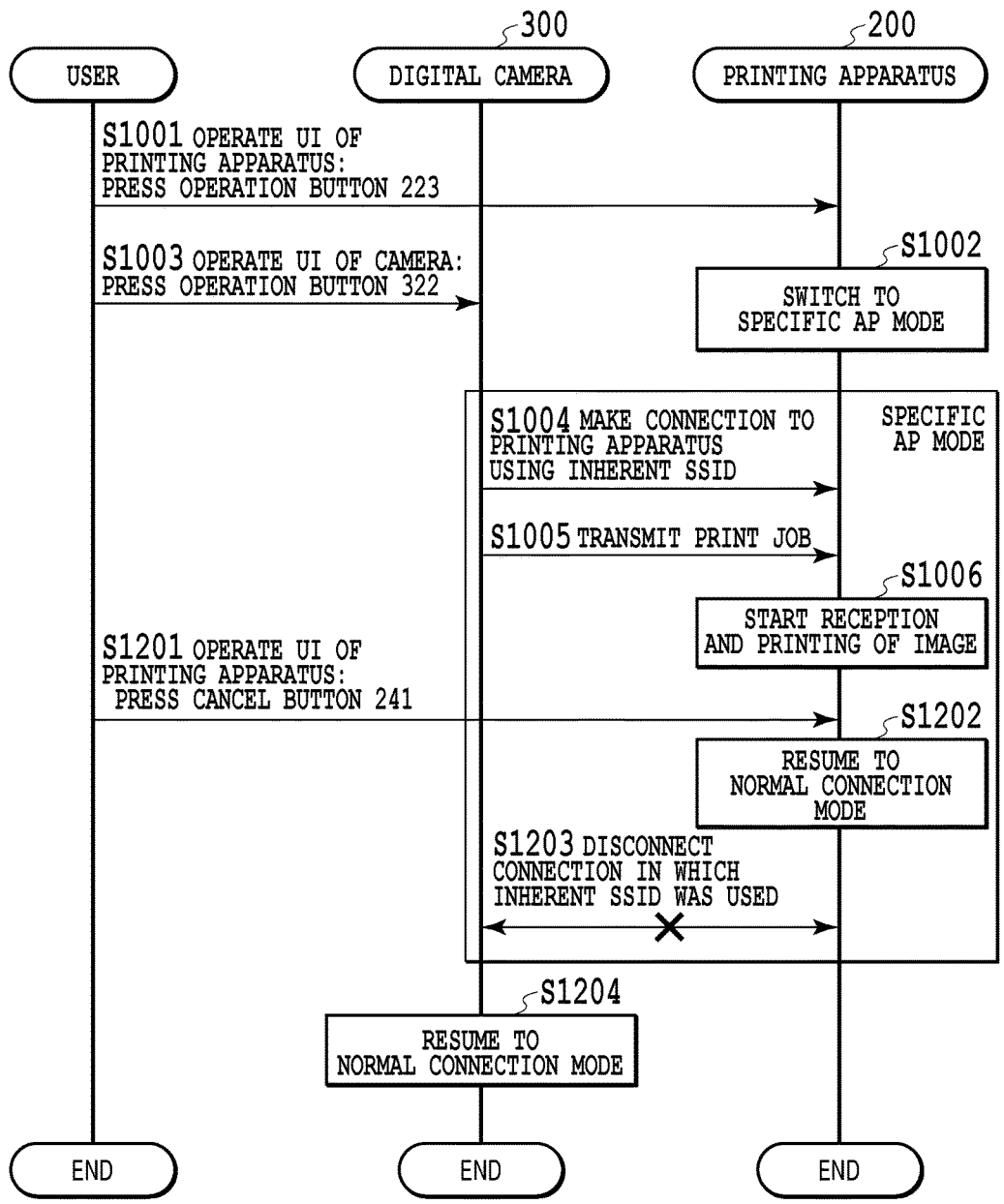
FIG. 12 is a sequence diagram relating to still another example of the direct printing according to the first embodiment.

FIG. 12 is a sequence diagram relating to still another example of direct printing between the printing apparatus 200 and the digital camera 300 according to the present embodiment. The sequence diagram of FIG. 12 differs from that of FIG. 10 in that the former shows a sequence in a case where user's cancel operation is made on the printing apparatus 200 during printing by the printing apparatus 200.

In the sequence diagram shown in FIG. 12, the processing of Step S1001 through Step S1006 is identical to the processing denoted by the same reference numerals in FIG. 10, and thus their explanations will be omitted.

In Step S1201, once the cancel button 241 displayed on the now-printing screen 240 is pressed, the printing apparatus 200 stops the execution of a print job.

In Step S1202, the printing apparatus 200 resumes the wireless LAN connection mode to the normal connection mode.

As a result of processing of Step S1202, the wireless LAN connection between the printing apparatus 200 operating in the specific AP mode and the digital camera 300 is to be disconnected in Step S1203.

In Step S1204, the digital camera 300 detects that the wireless LAN connection to the printing apparatus 200 is disconnected, and then resumes the wireless LAN connection mode to the normal connection mode.

According to the present embodiment, as described above, the printing apparatus 200 and the digital camera 300 make wireless LAN connection in the specific AP mode. Moreover, the printing apparatus 200 according to the present embodiment disables network services other than the ones required for the direct printing at the time of transiting to the specific AP mode. Specifically, at least some of the network services that are enabled in the infrastructure mode are to be disabled. Since identical information for the same model such as the above-described inherent SSID and the inherent password is less likely to be used in the infrastructure mode, its security may be higher than that of the specific AP mode. In the present embodiment, since the network services enabled in the infrastructure mode are to be disabled, the risk of equipment unintended by the user being connected and an unintended service being executed can be prevented in a case where the printing apparatus transits to the specific AP mode. Specifically, the risk in which a document placed on a scanner of the printing apparatus is read or a file stored in a memory card connected to the printing apparatus is read out from equipment owned by a third person can be prevented. Due to this configuration, the direct printing via a wireless LAN can be achieved while maintaining security.

[Second Embodiment]

Figure 13:
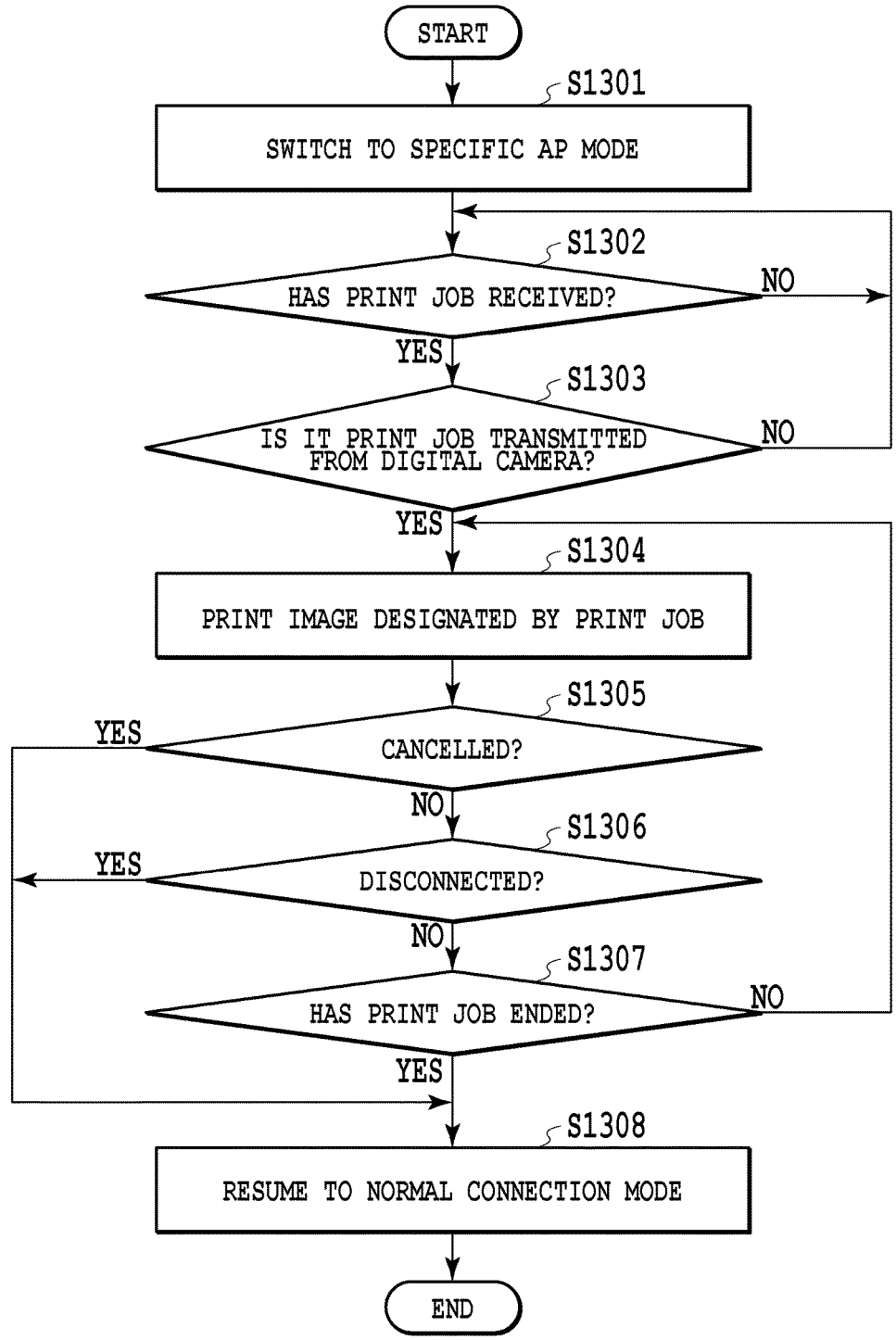
FIG. 13 is a flow chart showing steps of a printing apparatus according to a second embodiment.

FIG. 13 is a flow chart showing steps of switching a wireless LAN switching mode by a printing apparatus 200 according to a present embodiment. The flow chart of FIG. 13 shows a series of switching steps executed by the CPU 201 which is started upon pressing the operation button 223 as a trigger while the home screen 220 (in FIGS. 4A to 4C) is displayed on the operation unit 208 of the printing apparatus 200.

In Step S1301, the CPU 201 of the printing apparatus 200 controls the wireless LAN control circuit 209 to switch the wireless LAN connection mode to a mode in which the printing apparatus 200 is set as an access point. At this time, since connection is made to the digital camera 300 which is an apparatus who has issued a print job, the CPU 201 operates the printing apparatus 200 in the specific AP mode using the inherent SSID and the inherent authentication password. It should be noted that, after processing in S1301, processing of disabling some network services in S802 in FIG. 8 may be executed.

In Step S1302, the CPU 201 determines whether a job is received, and if the job is received (YES in Step S1302), the process transits to Step S1303. If the job is not received, (NO in Step S1302), the process returns to Step S1302.

In Step S1303, the CPU 201 of the printing apparatus 200 determines whether the job received in Step S1302 is a print job issued by the digital camera 300. If it is not the print job issued by the digital camera 300 (NO in Step S1303), the job received in Step S1302 is not executed and the process transits back to Step S1302. Here, the job determined to be NO in Step S1303 corresponds to a print job, for example, indicating a printing instruction given by an apparatus other than the printing apparatus 200 (such as a PC) connected to the access point 100 via the wireless LAN (in FIG. 1). Alternatively, the job also includes a facsimile transmission job indicating an instruction to transmit a facsimile and a scan job indicating an instruction to read document given by the above PC. It should be noted that the CPU 201 can determine an issuer of the received job by using various publicly-known methods. For example, the CPU 201 can analyze header information of transmission data of a packet type to specify an issuer of a print job transmitted by the packet. Moreover, the printing apparatus 200 compares, in S1303, equipment information indicating equipment in which printing is allowed in the specific AP mode and an issuer of the print job to determine whether or not to execute the print job. The above equipment information is stored in the nonvolatile memory 210, and a certain model, for example, is indicated as equipment in which printing is allowed in the specific AP mode. Alternatively, in a case where equipment information indicates a certain manufacturer and a manufacturer specified by the print job is found out to be identical to the certain manufacturer indicated by the equipment information, the printing may be performed in the specific AP mode.

Incidentally, the printing apparatus 200 according to the present embodiment may also continue its connection to the access point 100 even after the transition to the specific AP mode. In this case, due to the determination processing of Step S1303, it is an advantage that a job given from an apparatus other than the digital camera 300 (such as a PC) which is connected in the specific AP mode can be eliminated. Further, the determination in S1303 is not made in the infrastructure mode, and the print job is received from an apparatus not indicated by the above equipment information.

In a case where a job received in Step S1302 is a print job issued by the digital camera 300 (YES in Step S1303), the process transits to Step S1304. In a case where the job is not a print job issued by the digital camera 300 (NO in Step S1303), the CPU 201 generates an error notice in accordance with a protocol of each network service and transmits the error notice to an apparatus who has issued the job. The job determined to be NO in Step S1303 is to be discarded thereafter.

As such, the printing apparatus 200 (i.e., CPU 201) according to the present embodiment executes, in a case where the received job is a print job issued by the digital camera 300, processing in accordance with the received print job in the processing of Step S1304 and thereafter. Such CPU 201 functions as an accepting unit for selectively accepting a job issued by the digital camera 300. In the flow chart shown in FIG. 13, processing of Step S1304 through Step S1308 is identical to the processing of Step S804 through Step S808 in FIG. 8, and thus their explanations will be omitted.

According to the present embodiment, as described above, the wireless LAN connection is made between the printing apparatus 200 and the digital camera 300 in the specific AP mode, whereby the direct printing via a wireless LAN can be achieved while maintaining security. In other words, the printing apparatus 200 according to the present embodiment selectively accepts a job given from the digital camera 300 at the time of transiting to the specific AP mode. Accordingly, the risk in which a document placed on a scanner of the printing apparatus is read or a file stored in a memory card connected to the printing apparatus is read out from equipment owned by a third person can be prevented.

According to the above embodiments, the digital camera has been exemplified as equipment to instruct printing, but the example is not limited to this, and may be various types of equipment such as a PC and a smartphone. Moreover, according to the above embodiments, the printing apparatus has been exemplified as an apparatus to limit network services (i.e., functions) in the specific AP mode. However, the example is not limited to this, and may be various types of apparatuses such as a PC and a smartphone.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The printing apparatus of the present invention can avoid using a function that differs from the one intended by a user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-097134, filed May 13, 2016, which is hereby incorporated by reference wherein in its entirety.

What is claimed is:

1. A printing apparatus which serves as a first access point based on inherent authentication information for a wireless LAN connection, the printing apparatus comprising:
   one or more processors; and
   a memory having stored thereon instructions, which, when executed by the one or more processors, cause the printing apparatus to:
   make a wireless LAN connection in at least either one of:
      a first connection mode for making a wireless LAN connection to an image processing apparatus in which the inherent authentication information is stored; and
      a second connection mode for making a wireless LAN connection to the image processing apparatus via a second access point provided by an apparatus other than the printing apparatus and the image processing apparatus; and
   control, in a case of making a connection in the first connection mode, a first function provided by the printing apparatus to be enabled and a second function which is enabled in the second connection mode to be disabled,
   wherein the first function includes a function which receives a first print job from a first image processing apparatus connected in the first connection mode, and the second function includes a function which receives a second print job from a second image processing apparatus which is not connected in the first connection mode, and
   wherein the first print job is executed and the second print job is not executed in a case where a connection is made in the first connection mode, based on information received from the first image processing apparatus as a result of the connection made in the first connection mode.

2. The printing apparatus according to claim 1, wherein the first function includes a function of providing the image processing apparatus with a connection for transferring an image.

3. The printing apparatus according to claim 1, wherein the instructions, when executed by the one or more processors further cause the printing apparatus to read a document, wherein the second function includes a function of reading the document.

4. The printing apparatus according to claim 1, wherein the second function includes a function of providing a user interface in response to an access from a web browser provided by an external apparatus.

5. The printing apparatus according to claim 1, wherein the second function includes a function of providing a facsimile transmission.

6. The printing apparatus according to claim 1, wherein the instructions, when executed by the one or more processors, further cause the printing apparatus to:
serve as the first access point in response to receiving input at the printing apparatus; and
in a case where a connection request from the image processing apparatus includes the inherent authentication information, establish a connection between the image processing apparatus and the printing apparatus serving as the first access point to make a wireless LAN connection in the first connection mode.

7. The printing apparatus according to claim 6, wherein the connection request from the image processing apparatus is transmitted to the printing apparatus in response to receiving input at the image processing apparatus.

8. The printing apparatus according to claim 1, wherein the instructions, when executed by the one or more processors, further cause the printing apparatus to execute printing based on a print job accepted as a result of the connection in the first connection mode.

9. The printing apparatus according to claim 8, wherein, in a case where an instruction to cancel printing is made during the printing based on the print job accepted as a result of the connection in the first connection mode, processing of disconnecting the connection in the first connection mode is executed.

10. The printing apparatus according to claim 1, wherein the image processing apparatus is a digital camera.

11. The printing apparatus according to claim 1, wherein the instructions, when executed by the one or more processors, further cause the printing apparatus to receive a print job and determine whether the received print job is the first print job or the second print job, in a case where a connection is made in the first connection mode.

12. The printing apparatus according to claim 11, wherein the information received from the first image processing apparatus indicates an issuer of the print job, and
wherein the received print job is determined to be the first print job based on the information received from the first image processing apparatus and equipment information indicating equipment in which printing is allowed in the first connection mode, which is stored in the printing apparatus.

13. A printing system including a printing apparatus serving as a first access point based on inherent authentication information for a wireless LAN connection and an image processing apparatus in which the inherent authentication information is stored, the printing system comprising:
one or more processors; and
a memory having stored thereon instructions, which, when executed by the one or more processors, cause the printing system to:
make a wireless LAN connection in at least either one of:
a first connection mode for making a wireless LAN connection to the image processing apparatus while the printing apparatus serves as the first access point; and
a second connection mode for making a wireless LAN connection to the image processing apparatus via a second access point provided by an apparatus other than the printing apparatus and the image processing apparatus; and
control, in a case of making a connection in the first connection mode, a first function provided by the printing apparatus to be enabled and a second function which is enabled in the second connection mode to be disabled,
wherein the first function includes a function which receives a first print job from a first image processing apparatus connected in the first connection mode, and the second function includes a function which receives a second print job from a second image processing apparatus which is not connected in the first connection mode, and
wherein the first print job is executed and the second print job is not executed in a case where a connection is made in the first connection mode, based on information received from the first image processing apparatus as a result of the connection made in the first connection mode.

14. The printing system according to claim 13, wherein the instructions, when executed by the one or more processors, further cause the printing system to read a document, wherein the second function includes a function of reading the document.

15. The printing system according to claim 13, wherein the second function includes a function of providing a user interface in response to an access from a web browser provided by an external apparatus.

16. The printing system according to claim 13, wherein the second function includes a function of providing a facsimile transmission.

17. The printing system according to claim 13, wherein the instructions, when executed by the one or more processors, further cause the printing system to receive a print job and determine whether the received print job is the first print job or the second print job, in a case where a connection is made in the first connection mode.

18. The printing system according to claim 17, wherein the information received from the first image processing apparatus indicates an issuer of the print job, and
wherein the received print job is determined to be the first print job based on the information received from the first image processing apparatus and equipment information indicating equipment in which printing is allowed in the first connection mode, which is stored in the printing apparatus.

19. A control method by a printing apparatus serving as a first access point based on inherent authentication information for a wireless LAN connection and an image processing apparatus in which the inherent authentication information is stored, the control method comprising:
connecting to make a wireless LAN connection between the printing apparatus and the image processing apparatus in at least either one of:

a first connection mode for making a wireless LAN connection to the image processing apparatus while the printing apparatus serves as the first access point; and a second connection mode for making a wireless LAN connection to the image processing apparatus via a second access point provided by an apparatus other than the printing apparatus and the image processing apparatus; and controlling, in a case of making a connection in the first connection mode, a first function provided by the printing apparatus to be enabled and a second function which is enabled in the second connection mode to be disabled, wherein the first function includes a function which receives a first print job from a first image processing apparatus connected in the first connection mode, and the second function includes a function which receives a second print job from a second image processing apparatus which is not connected in the first connection mode, and wherein, by the controlling, the first print job is executed and the second print job is not executed in a case where a connection is made in the first connection mode, based on information received from the first image processing apparatus as a result of the connection made in the first connection mode.

* * * * *